Jan. 12, 1943.    B. A. MALKIN    2,307,746
DRIVE MECHANISM FOR PAPER MAKING MACHINES
Filed May 26, 1941    2 Sheets-Sheet 1

INVENTOR
BERNARD. A. MALKIN
BY Fetherstonhaugh & Co.
ATTORNEYS

Jan. 12, 1943.　　B. A. MALKIN　　2,307,746
DRIVE MECHANISM FOR PAPER MAKING MACHINES
Filed May 26, 1941　　2 Sheets-Sheet 2

INVENTOR
BERNARD. A. MALKIN
BY Fetherstonhaugh & Co.
ATTORNEYS

Patented Jan. 12, 1943

2,307,746

UNITED STATES PATENT OFFICE 2,307,746

DRIVE MECHANISM FOR PAPERMAKING MACHINES

Bernard A. Malkin, Lachine, Quebec, Canada, assignor to Dominion Engineering Works Limited, Lachine, Quebec, Canada Application May 26, 1941, Serial No. 395,185

6 Claims. (Cl. 74—405)

This invention relates to driving mechanisms for paper making machines and has particular reference to driving mechanisms of the type in which each of the various sections of a paper machine is driven from a common main shaft through the agency of a separate driving unit so that the various sections may be operated, or permitted to operate, at different relative speeds.

The purpose of the present invention is to improve the construction of the driving units used in this type of driving mechanism so that the component parts of the units may be assembled in a more compact manner to materially shorten the overall length of the unit and so that anti-friction bearings may be employed to better advantage than heretofore for mounting the rotating parts of the unit.

The foregoing and other objects and advantages of the invention will be readily apparent from the following detailed description taken in connection with the accompanying drawings, in which—

Figure 1:
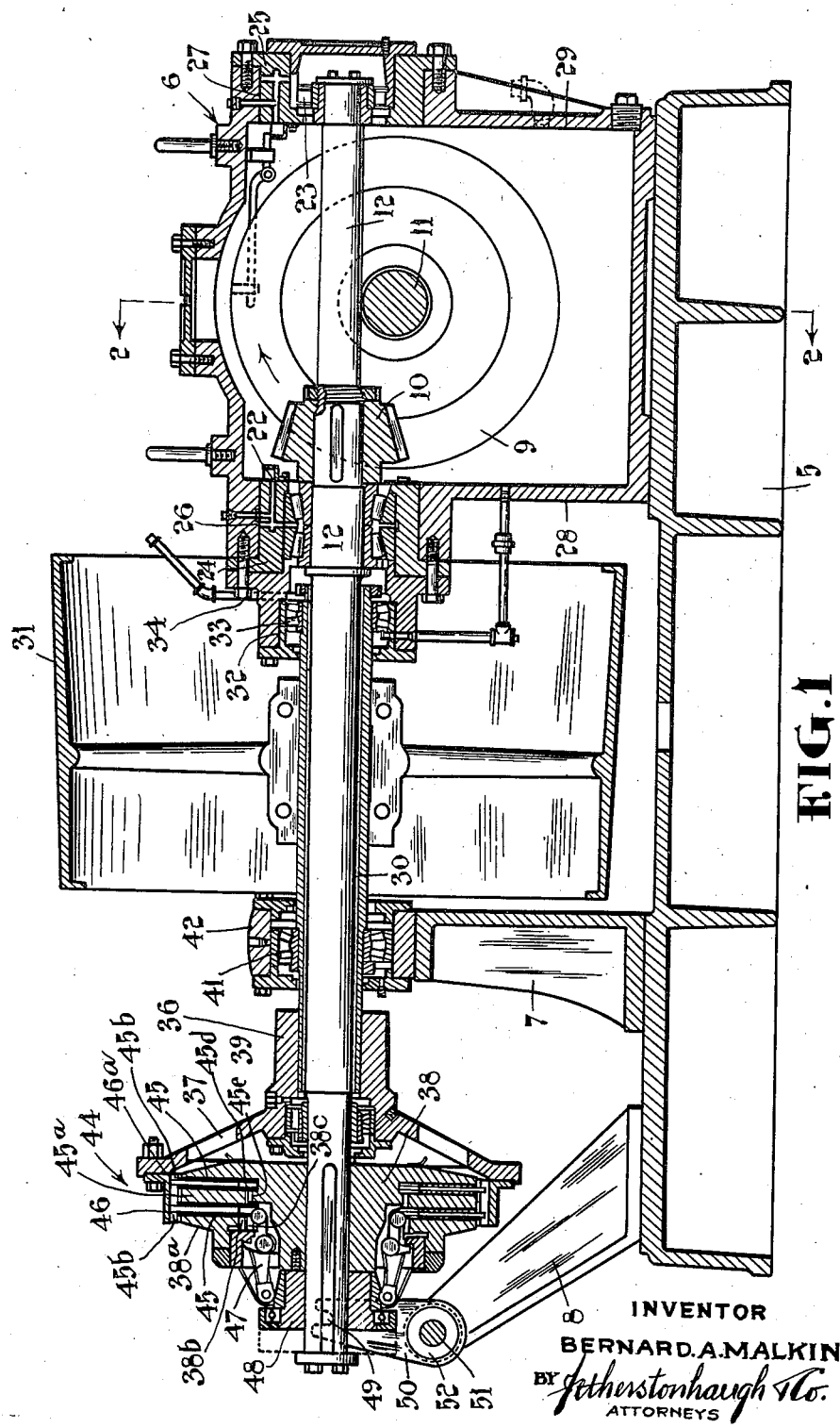
Figure 2:
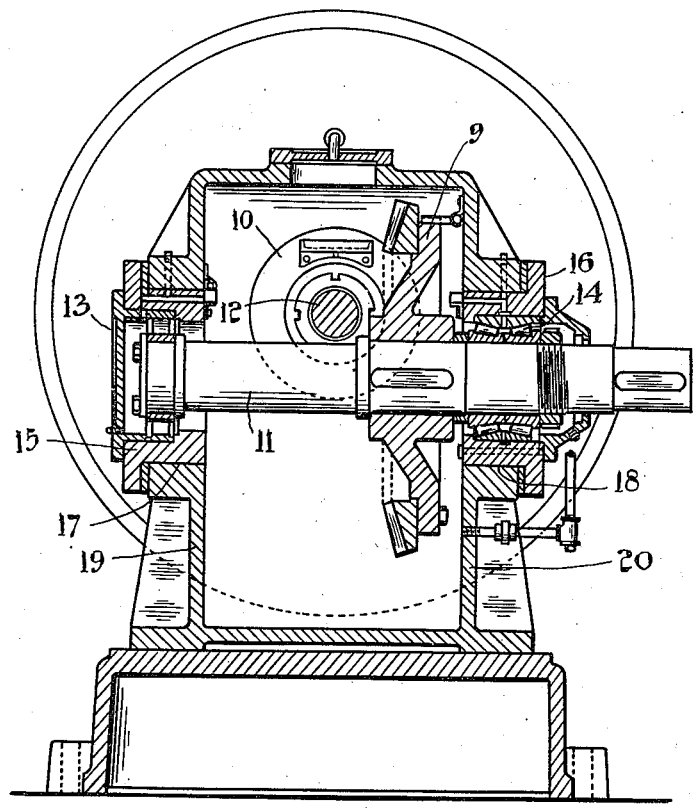

Fig. 1 is a longitudinal sectional view of a drive unit constructed in accordance with my invention, and Fig. 2 is a transverse sectional view taken along the line 2—2 of Fig. 1.

As shown in these drawings, my improved drive unit comprises a base 5 on which is mounted a gear casing 6, a standard 7 and a bracket 8. The gear casing 6 encloses intermeshing gears 9 and 10 which are respectively fixed to shafts 11 and 12. The shaft 11 extends transversely across base 5 and is journalled in anti-friction bearings 13 and 14 contained in bearing housings 15 and 16 which are respectively fitted in openings 17 and 18 provided in the side walls 19 and 20 of the gear casing 6. One end of shaft 11 projects outwardly beyond the bearing housing 16 and is adapted to be connected by a suitable coupling or gearing (not shown) to the section of the paper machine which is to be driven thereby. That portion of shaft 12 which lies within the casing 6 is journalled in anti-friction bearings 22 and 23 arranged in bearing housings 24 and 25 fitted in openings 26 and 27 provided in the casing walls 28 and 29. That portion of shaft 12 which lies outside casing 6 extends through a tube or quill 30 on which is mounted a cone pulley 31 adapted to be belt driven in the conventional manner from a similar cone pulley on the main drive shaft (not shown). One end of the tube or quill 30 is journalled in an anti-friction bearing 32 arranged in a bearing housing 33 which is bolted, as at 34, to the previously mentioned bearing housing 24. The other end of the tube or quill 30 is secured to the hub 36 of a clutch member 37 which cooperates with a complementary clutch member 38 fixed to rotate with the shaft 12. The clutch member 37 and the attached end of the tube or quill 30 are centered on shaft 12 by an anti-friction bearing 39. The weight of the quill 30 and pulley 31 is borne mainly by the bearing 32 and by an intermediate anti-friction bearing 41 arranged in a bearing housing 42 mounted on the standard 7. The three bearings 32, 39 and 41 serve as supporting and aligning bearings for the tube or quill 30 whereby the latter is maintained in spaced concentric relation to the shaft 12. The clutch members 37 and 38 constitute, respectively, the driving and driven clutch members of a conventional clutch assembly indicated at 44. This assembly includes clutch disks 45 and 45a adapted to be clamped tightly against the clutch member 38 by a clamping plate 38a. The clutch disks 45 are provided, at their outer peripheries, with teeth 45b meshing with teeth 46a carried by a ring 46 attached to the clutch member 37. The clutch disk 45a is provided, at its inner periphery, with teeth 45d meshing with coacting teeth 45e of the clutch member 38. The clamping plate 38a is provided with teeth 38b meshing with teeth 38c of the clutch member 38. The clamping plate 38a is moved into and out of clamping engagement with the clutch disks 45 and 45a by conventional actuating members 47 connected to a collar 48 which slides on the shaft 12. Pins 49 projecting from the collar 48 are engaged by clutch shifting forks 50 fixed to a clutch actuating shaft 51 which extends through a bearing 52 provided at the upper end of bracket 8. From this it will be seen that a drive connection between the tube or quill 30 and the shaft 12 may be established or disrupted by appropriate rotation of the clutch operating shaft 51.

One advantage of the assembly described herein is that it provides for a compact assembly of the gearing casing 6, pulley 31 and clutch assembly 44, which materially reduces the overall length of the unit as compared with similar units employing anti-friction bearings for mounting the rotating parts. In this connection it will be noted that the fixing of the pulley 31 to an independently mounted quill or tube 30 surrounding the pulley shaft 12 enables the pulley to be brought up close to the casing 6 and also enables one end of the tube or quill 30 to be supported in an anti-friction bearing housing attached directly to the casing 6 in line with the anti-friction bearing housing 24 through which the shaft 12 extends. This arrangement, with the location of the clutch assembly 44 at the end of the tube or quill 30 remote from the casing 6, enables the length of the complete assembly to be materially shortened as compared with similar units now in use.

A further feature of the assembly described herein is that the mounting of the tube or quill 30 by means of anti-friction bearings 32, 39 and 41 which are concentric with the shaft bearings 22 and 23 ensures proper alignment of the clutch members 37 and 38.

A further feature of the assembly described herein is the location of the anti-friction bearings 32 and 41 between the tube or quill 30 and the surrounding bearing housings 33 and 42. These bearings are heavily loaded by the weight of the tube or quill 30, the pulley 31 and the driving belt which passes around said pulley. Consequently, in order to prevent deterioration thereof by localized wear, it is essential that these bearings be arranged so that they are functioning whenever the driving unit is in use. If these bearings were interposed between the quill or tube 30 and the shaft 12 the component elements thereof, such as the inner and outer races and the anti-friction balls or rollers, would remain in the same relative position during the period that the tube or quill is clutched to the shaft. This, of course, would result in localizing the wear to those portions of the race rings and the balls or rollers which happen to be in contact with each other at the instant the clutch is engaged. Owing to the weight of the pulley and the quill and to vibration of these parts due to unbalance and to the pull of the driving belt, this localized wear on the component parts of the bearings 32 and 41 would soon result in failure of these bearings. In my assembly the component parts of the bearings 32 and 41 are always changing their relative position during operation of the unit so that the wear imposed thereon is evenly distributed over the surfaces of the race rings and the engaging balls or rollers. This is also true of the wear due to any sliding action which takes place between the race rings and the balls or rollers of the bearing due to flexure of the quill 30 and/or the shaft 12.

With reference to the bearing 39 which is interposed between the shaft 12 and the clutch member 37, it may be pointed out that this bearing serves mainly as an aligning bearing and is not heavily loaded. In this connection it will be noted that the weight load of the clutch member 37, which is comparatively light, is sustained mainly by the tube or quill 30 and its bearings 32 and 41. Consequently, it will be seen that, in view of the light load which it is called upon to sustain, the bearing 39 is not subjected to excessive wear even though the races and anti-friction elements thereof remain in the same relative position during the period that the tube or quill 30 is clutched to the shaft 12.

Having thus described what I now consider to be the preferred embodiment of this invention it will be understood that various modifications may be resorted to within the scope and spirit of the invention as defined by the appended claims.

Having thus described my invention, what I claim is:

1. A driving unit of the character described comprising a gear casing, anti-friction bearing housings mounted in aligned openings provided in opposite walls of said casing, a pulley shaft extending through both of said bearing housings and having a substantial portion of its length projecting beyond one side of said casing, anti-friction bearings interposed between the circumferential walls of said bearing housings and the portions of the shaft passing therethrough, a tube surrounding a portion of the shaft located outside said casing, a pair of bearing housings through which said tube extends, anti-friction bearings arranged between the circumferential walls of the last mentioned bearing housings and the portions of the tube passing therethrough, said bearings serving to support said tube in concentric spaced relation to the portion of the shaft passing therethrough, one of said last mentioned bearing housings being supported independently of said casing and the other being attached to and supported by one of the first mentioned bearing housings, a pulley fixed to said tube, a second shaft extending through said casing and geared to said pulley shaft and means for releasably clutching said tube to said pulley shaft, said last mentioned means comprising coacting clutch members carried, respectively, by the end of the tube remote from said casing and by an adjacent portion of the pulley shaft.

2. A driving unit as set forth in claim 1 including an anti-friction bearing interposed between the pulley shaft and the clutch member carried by said tube.

3. A driving unit of the character described comprising a gear casing, a shaft extending across said casing and journalled in bearings provided in two opposite walls of said casing, a second shaft extending through the casing at right angles to the first mentioned shaft and projecting a substantial distance beyond one side of the casing, said second shaft being journalled in anti-friction bearings contained in surrounding bearing housings fitted in openings provided in opposite walls of the casing which are substantially at right angles to the first mentioned walls, a pair of tube supporting bearing housings surrounding a portion of the second shaft which is located outside of said casing, said tube supporting bearing housings being spaced apart longitudinally of said shaft so that one of said housings is positioned in close proximity to one of said first mentioned bearing housings, a tube surrounding and spaced from said second shaft with one end of the tube extending into the tube supporting bearing housing which is located adjacent said casing and with the other end of the tube extending through and beyond the remaining tube supporting bearing housing, anti-friction bearings interposed between the circumferential walls of said tube supporting bearing housings and the portions of the tube passing therethrough, a pulley having its hub portion secured to said tube intermediate the tube supporting bearing housing and co-acting clutch members carried by the ends of said tube and said second shaft which are remote from said casing.

4. A driving unit of the character described comprising a base, a gear casing mounted on the base at one end thereof, shaft supporting bearing housings mounted in aligned openings provided in opposite walls of the casing which extend transversely across the base, a tube supporting bearing housing aligned with and attached to the outer side of one of said shaft supporting bearing housings, a second tube supporting bearing housing aligned with the first mentioned tube supporting bearing housing and mounted on a bearing standard rising from the base adjacent the end of the base remote from said casing, a tube journalled in said tube supporting bearing housings by anti-friction bearing elements interposed between the outer surface of the tube and the surrounding circumferential walls of said housings, a pulley fixed to a portion of the tube lying between said tube supporting bearing housings, a pulley shaft extending through said tube out of contact therewith, said shaft passing through said shaft supporting bearing housings and being supported by anti-friction bearings arranged between the circumferential walls of said housings and the portions of the shaft passing therethrough, a second shaft extending through said casing at right angles to said pulley shaft, intermeshing gears carried by said shafts and means for releasably clutching said tube to said pulley shaft.

5. A driving mechanism for paper making machines comprising a base, a gear casing and a standard mounted on and spaced apart longitudinally of said base, a shaft extending across the interior of said casing at right angles to said base, said shaft being journalled in bearings provided in two opposite walls of said casing and having one end projecting beyond said casing for driving connection with a section of a paper making machine, a second shaft extending through said casing in the longitudinal direction of the base and through a tube supporting bearing housing carried by said standard, said second shaft being geared to said first mentioned shaft within said casing and being also journalled in anti-friction bearings contained in surrounding bearing housings fitted in openings provided in opposite walls of the casing which are substantially at right angles to the first mentioned walls, a second tube supporting bearing housing surrounding a portion of the second shaft which is located exteriorly of and immediately adjacent the side of the casing which is nearest said standard, said second tube supporting bearing housing being supported from the last mentioned side wall of said casing in abutting relation with the shaft bearing housing carried thereby, a tube surrounding and spaced from said second shaft with one end of the tube extending into the tube supporting bearing housings carried by said casing and the other end of the tube extending through and beyond the tube supporting bearing housing carried by said standard, anti-friction bearings interposed between the circular walls of said tube supporting bearings and the portions of the tube passing therethrough, a pulley having its hub portion secured to said tube intermediate said casing and said standard and means for establishing and disrupting a drive connection between those ends of the said second shaft and said tube which are located at the side of the pulley remote from said casing.

6. Driving mechanism as set forth in claim 5 in which the last mentioned means comprises a driving member carried by an end portion of the second shaft which projects beyond said tube, a driven member carrier by the adjacent end of the tube and overlying a portion of the second shaft which projects beyond said tube, an anti-friction bearing interposed between said second shaft and the overlying portion of said driven member and means for establishing and disrupting a driving connection between said drive and driven members.

BERNARD A. MALKIN.